(12) United States Patent
Zhong et al.

(10) Patent No.: US 12,218,906 B1
(45) Date of Patent: Feb. 4, 2025

(54) CENTRALIZED TECHNOLOGY ACCESS CONTROL

(71) Applicant: Morgan Stanley Services Group Inc., New York, NY (US)

(72) Inventors: Yuhu Zhong, Shanghai (CN); Jun Wu, Shanghai (CN); Yihua Tian, Shanghai (CN); Wei Jan, Shanghai (CN)

(73) Assignee: Morgan Stanley Services Group Inc., New York, NY (US)

( * ) Notice: Subject to any disclaimer, the term of this patent is extended or adjusted under 35 U.S.C. 154(b) by 97 days.

(21) Appl. No.: 18/051,964

(22) Filed: Nov. 2, 2022

(51) Int. Cl.
*H04L 61/4523* (2022.01)
*H04L 9/40* (2022.01)
*H04L 101/30* (2022.01)
*H04L 101/60* (2022.01)

(52) U.S. Cl.
CPC ........ *H04L 61/4523* (2022.05); *H04L 63/104* (2013.01); *H04L 2101/30* (2022.05); *H04L 2101/60* (2022.05)

(58) Field of Classification Search
None
See application file for complete search history.

(56) References Cited

U.S. PATENT DOCUMENTS

| | | | |
|---|---|---|---|
| 6,609,121 B1 * | 8/2003 | Ambrosini | G06F 16/282 |
| | | | 707/769 |
| 7,870,156 B2 | 1/2011 | Rutter et al. | |
| 2011/0016162 A1 * | 1/2011 | Booth | G06F 16/81 |
| | | | 707/E17.108 |
| 2012/0042354 A1 | 2/2012 | Vitiello et al. | |
| 2013/0097223 A1 | 4/2013 | Mishkevich et al. | |
| 2018/0188720 A1 | 7/2018 | Bushey et al. | |
| 2018/0307192 A1 | 10/2018 | Linscott et al. | |
| 2021/0097532 A1 | 4/2021 | Mahasuverachai | |
| 2021/0266323 A1 | 8/2021 | Jani et al. | |
| 2023/0011588 A1 * | 1/2023 | Parry | G06F 16/24573 |

* cited by examiner

*Primary Examiner* — William G Trost, IV
*Assistant Examiner* — Christopher P Cadorna
(74) *Attorney, Agent, or Firm* — K&L Gates LLP

(57) ABSTRACT

Presented herein are systems and methods for an access control system deployable in an IT Infrastructure System (enterprise) to automatically discover an unmanaged IT asset or resource based on registration metadata stored in a CMDB; in response to discovery of the unmanaged IT resource, generating based on the registration metadata, in an LDAP server of the enterprise, an entitlement for one or more groups of enterprise users, wherein, for each of the one or more users or groups, the entitlement is embodied in an LDAP group name, wherein the LDAP group name is determined based on IT resource application metadata and/ or on a pre-defined LDAP group naming convention; and mapping, based on the LDAP group name, the entitlement for each of the one or more users or groups to one or more specified target IT assets of the enterprise already registered, including software applications, or hardware including databases or servers.

19 Claims, 5 Drawing Sheets

CENTRALIZED TECHNOLOGY ACCESS CONTROL

BACKGROUND

Large scale enterprise IT infrastructure systems are generally made up of various IT assets, including hardware, such as databases, servers, computing devices and terminals, as well as software, including applications, operating systems, administrative and access control tools. Generally these various assets are managed separately in different silos and by distinct systems without centralized administration, communication, and management. This independent and decentralized nature of IT assets makes it difficult for an operator or administrator of the enterprise IT infrastructure system to make changes to the enterprise IT infrastructure system that would apply across the whole enterprise IT infrastructure system.

SUMMARY

In a general aspect, embodiments of the present invention are directed to a centralized technology access control tool or system (hereinafter referred to as "TAC"), that in various embodiments is self-adaptive and automatic. The TAC centralizes the creation, modification, management, and access of user and group roles, entitlements to IT resources and IT assets, and their associations with other IT resources and assets within an enterprise. In numerous embodiments it may undertake this by automatically discovering, an IT resource that is unmanaged (also referred to herein as "new IT resource" or "new IT asset"), and in response to the discovery of the IT resource, the TAC may generate an entitlement in a lightweight directory access protocol ("LDAP") server of the enterprise, where the entitlement may be for a user, a group of users or for multiple groups. The entitlement may be created based on a pre-defined rule-based naming or entitlement creation convention (also referred to herein as "naming convention"), which uses meta data associated with the IT resource to create the entitlement. The entitlement may also be created based on meta data associated with the resource. The entitlement is then mapped by the TAC for the users or groups of enterprise users of the new IT resource to one or more preexisting or target IT assets of the enterprise that are already registered (these are interchangeably referred to as "Target IT asset" or "Pre-existing IT asset") and form part of the enterprise. A user or a user belonging to a group may then request access to an IT resource or to be granted a role within the enterprise to allow use of the IT resource, these may be granted or denied based on the entitlement(s) created associated with the IT resource.

FIGURES

Various embodiments of the present invention are described herein by way of example in connection with the following figures.

FIG. 1 presents a diagrammatical illustration of an IT infrastructure system with a centralized technology access tool to provide automated entitlement creation and control.

DESCRIPTION

Current IT infrastructures fail to integrate their various components and IT assets, including software, and hardware such as computing devices, databases, and servers, with each individual or each group of IT assets running in their own silos without a uniform management system that may apply to them all. Therefore, when changes have to be made to more than one component or asset of the enterprise, an administrator would have to access each individual silo, applications, or groups of IT assets separately, and undertake the changes or updates to each asset individually, and repeat the process multiple times to effect the change across the enterprise. For example, without a centralized mechanism to manage issues such as user and group permissions, IT asset security, and deployment of new users, programs or hardware, large amounts of administrative resources must be expended to make changes across the enterprise, especially if these components are distinct from each other in their hardware structures, their organization, the software they deploy, and the different programming languages and mechanisms they each use. A centralized system as described herein overcomes these issues, and allows changes to be made across the full enterprise IT infrastructure system without having to approach the different IT assets and systems separately.

The centralized and uniform system described in this disclosure allows, in various embodiments, changes and updates to be made across the enterprise IT infrastructure system from a central TAC tool that creates, maps, and manages rule-based entitlements for users, and groups of users across the full enterprise. The TAC tool described herein allows a central mechanism to automatically create and control various entitlements that set and define user attributes, access permissions, and roles of users and groups in relation to IT assets. The TAC also maps various groups and roles between different IT assets and makes associations between assets based on created entitlements, and stores these entitlements centrally on central servers, to be accessible by the various components of the enterprise IT infrastructure system.

The TAC described herein is able, based on the pre-defined rules, to automatically undertake various actions to centrally and uniformly manage IT assets in an enterprise IT infrastructure system, including: detect changes such as the addition or registration of new IT assets in the enterprise IT infrastructure system, create the entitlements to allow users or groups to access the new IT assets based on these pre-defined rules, store the entitlements centrally, manage the entitlements, detect any errors and take remedial actions to correct or remove the entitlements.

Figure 1:
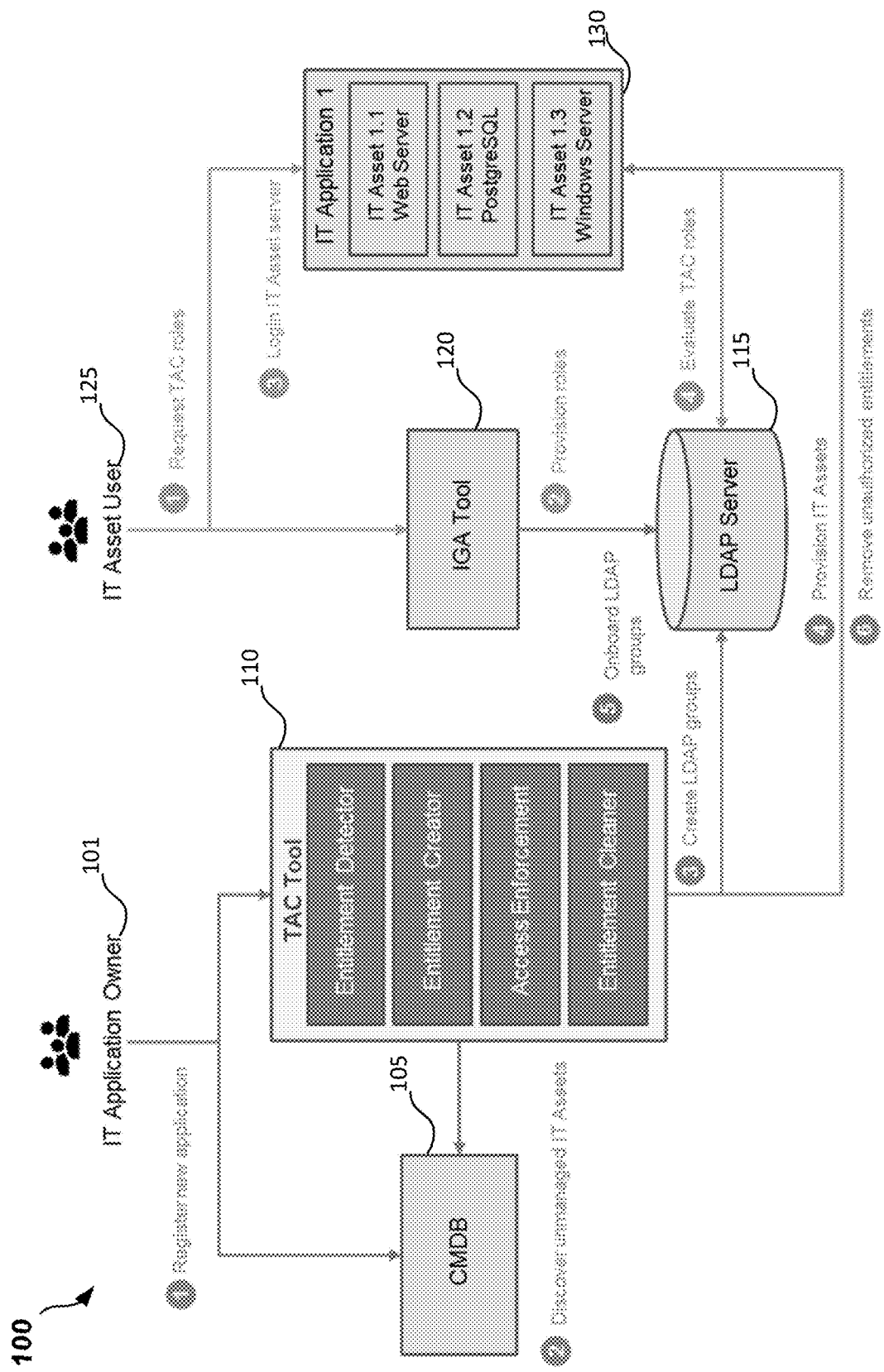

FIG. 1 presents a diagrammatical illustration of an enterprise IT infrastructure system with a centralized technology access tool to provide automated entitlement creation and control. The enterprise IT infrastructure system 100 (also referred to sometimes herein as "enterprise 100") is comprised of various components that operate, individually or in combination, to facilitate or undertake the various methods described in this disclosure. An IT application owner 101 may register a new IT resource or asset with and for the enterprise 100 in a centralized database 105. The new IT resource may be a new application or a new device (newly registered IT assets may include software and/or hardware assets to form part of the enterprise 100, and are interchangeably referred to herein as an "new IT resource", or "new IT asset"). The centralized database 105 may be a configuration management database (CMDB) (also referred to herein as CMDB 105). A new IT asset that is software based may represent all kinds of different IT Applications, such as CRM or ERP applications. An IT application may be run on, or be associated with, IT assets such as a Windows or Linux server, a PostgreSQL server, and/or a Web Server, etc.

The new IT resource or application may be registered in the enterprise and specifically CMDB 105 with information relating to any or all pre-existing IT assets in enterprise 100, that may be associated with the new IT resource. CMDB 105 may have partial or complete IT application and new IT resource related data fields stored in it, such as, for each IT resource/application, an IT resource/application ID, a resource/application type, a resource/application environment, and the associations with pre-existing IT assets, and the like. The CMDB 105 may contain identifying data such as meta data of the new IT asset that has been added to the enterprise 100. The meta data in CMDB 105 may include and are not limited to registration meta data, application meta data, meta data describing hardware components, and user meta data.

The enterprise 100 also includes a TAC tool (or system) 110 (also referred to herein as "TAC"). In several embodiments, the TAC 100 includes various modules including, for example, an entitlement detector module 111, an entitlement creator module 112, an access enforcement module 113, and an entitlement cleaner module 114. The entitlement detector module 111 of TAC 110 may automatically detect or discover a registered new IT resource or new IT asset in CMDB 105. The detection or discovering may occur based on periodic scans of the CMDB 105 by the entitlement detector module 111, or based on notifications or knowledge that the TAC tool 110 receives from one or more components of enterprise 100. In several embodiments the detecting may occur with entitlement detector module 111 communicating with, sending, or transmitting an API call to CMDB 105, and receiving a response to the API call from CMDB 105 that includes information about the newly registered IT asset, which information may comprise meta data that either informs entitlement detector module 111 that the new IT asset or resource is unmanaged, or allows the entitlement detector module 111 based on the meta data to determine that the newly registered IT resource or asset is yet unmanaged. As used herein, an "unmanaged" IT asset or resource is an IT asset or resource that is only known to networking infrastructure; it may or may not be known and accounted for in an asset inventory, and is not actively managed from an IT or security perspective.

In several aspects, after the entitlement detector module 111 discovers the unmanaged IT assets based on CMDB data automatically, it passes the detection result to the entitlement creator module 112, which creates LDAP groups or LDAP group names that define entitlements of users or groups of users. These LDAP group names are created by the entitlement creator module 112 as entitlements in LDAP server(s) 115 in a format based on pre-defined rules and using the meta data retrieved from CMDB 105 and/or the new IT asset. These entitlements may be adaptive and automatically updated based on changes to the enterprise 100, and intelligently and automatically incorporate new parameters in an LDAP group name including and not limited to the roles, groups, or descriptors of IT assets, based on detected changes in the CMDB and the rest of the enterprise 100 as needed. The LDAP servers 115 are used to store the created entitlements for the different IT resources and assets for access control and permissions. The LDAP servers 115 function as a central repository to allow all various components of the enterprise 100 to access and interact with the uniform and centralized entitlements created and managed by TAC. The uniform nature of the system of entitlements allows the various components to share a common platform based on the TAC 110 for updates and changes to occur and be communicated and applied across the whole enterprise 100.

The access enforcement module 113, after the creation of the entitlements, may then provision or map the new IT resource(s) to pre-existing components or pre-existing IT assets in the enterprise 100. This may for example include mapping a newly registered application to a pre-existing server of the enterprise 100, or to another pre-existing application such as an operating system running on one or more servers, or it may include mapping a device or newly deployed server or other hardware to other hardware and servers, or to software already deployed on the enterprise 100. IT asset registration or expansion may comprise horizontal or vertical deployments of the new IT resources or assets. Mapping of the new IT resources could in various embodiments be undertaken by a script or application that maps the new IT resource with the pre-existing IT assets or resources.

The LDAP group names and entitlements they define are on-boarded onto and stored in the LDAP server(s) 115 and may therefore be scanned for any failures or errors. The entitlement cleaner module 114 may identify unauthorized entitlements based on existing unique pre-defined entitlement structures and rules in the TAC Tool and conduct remediation to remove or modify the unauthorized entitlements automatically. The system 100 also includes an Identity Governance and Administration Tool (referred to herein as "IGA tool") 120, which provides entitlement lifecycle management capabilities to users or groups of users. The entitlement lifecycle management capabilities may include access requests, provisioning, review, and revocation of permissions and access. IGA tool 120 adopts the LDAP group names and manages them as entitlements for lifecycle management of IT assets and how they are accessed by users and groups of enterprise 100. The IGA tool 120 may also manage IT assets across the enterprise 100 based on internal documents, policies, rules, and administrative governance structures and/or based on the entitlements that are created by TAC 110.

When a user or group of users 125 attempts to request access to a registered IT asset, such as an application, the IGA tool 120 may be able to access a list of entitlements for the registered IT asset, for example from LDAP server 115, and determine whether a user 125 should have access to the IT asset. In various aspects, the user 125 does not have to request or attempt to access an IT asset, and IGA tool 120 may determine the entitlements automatically or periodically. The IGA tool 120 may check or determine based on a list or other available data in the LDAP server(s) 115 of entitlements that are stored and mapped onto IT assets whether the user 125 should be provided with access or assigned roles that allow the user 125 to utilize or access an IT asset governed by the entitlement. The IGA tool 120 may use entitlements individually or in combination with administrative or governance rules and policies.

The IGA tool 120 may then assign a user 125 a permission or role to access an IT asset upon login into an IT asset server 130. IT asset server 130 may hold various IT applications and/or several servers running different server and database software such as PostgreSQL and Windows for example. The servers or databases or other IT asset servers 130 may also evaluate the entitlements and roles created by the LDAP server 115 and/or the IGA tool 120 to enable the user 125 access to the services and IT resources governed by the entitlements and ensure that these roles apply to the user.

Figure 2:
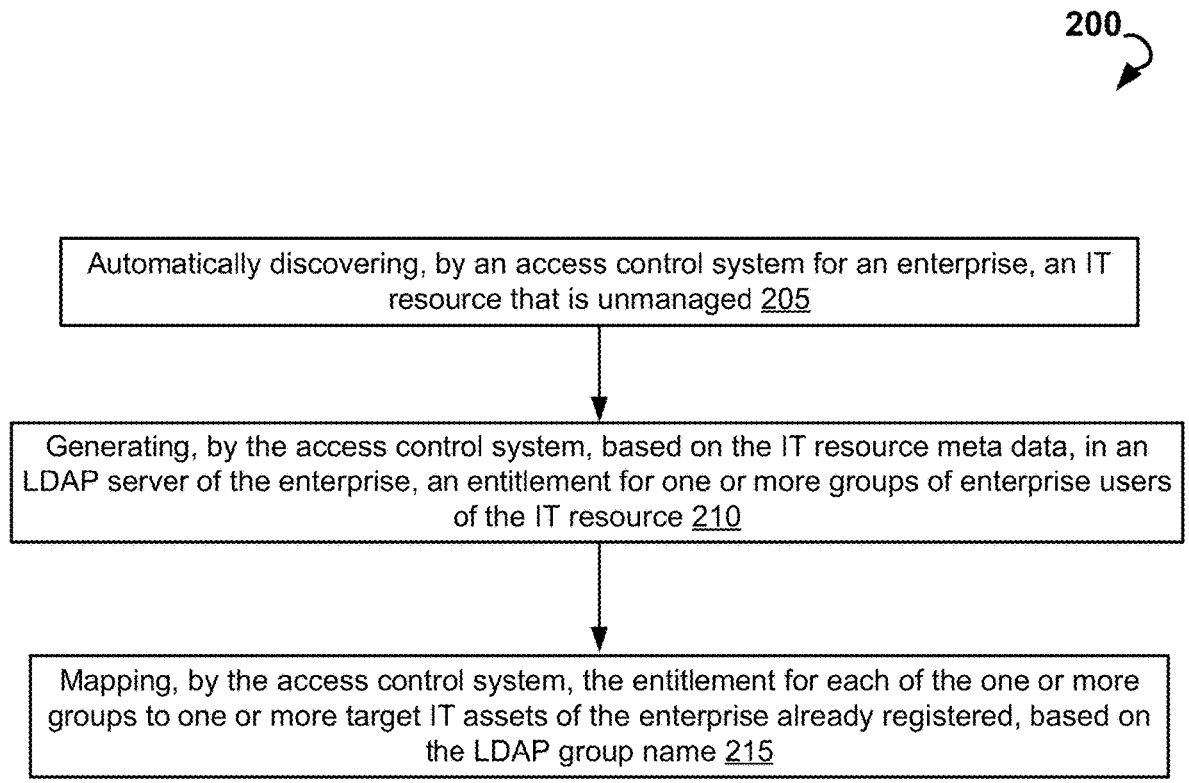
FIG. 2 is a flow chart of one embodiment of a process to provide automated entitlement creation and control for IT applications in an IT Infrastructure System.

FIG. 2 is a flow chart of one embodiment of a process to provide automated entitlement creation and control for IT applications in an enterprise IT Infrastructure System. The process or method 200 may initiate with an access control system or tool, such as TAC 110, FIG. 1, deployed as part of the enterprise IT infrastructure system 100, FIG. 1, automatically discovering, at step 205, an IT resource that is unmanaged. The unmanaged IT resource may be a new IT resource or new IT asset of the enterprise Infrastructure System 100. In several aspects, multiple new IT resources may be automatically discovered at step 205 simultaneously. In various embodiments the discovery is a discovery that an IT resource is unmanaged or alternatively that it is new. Being new, unregistered, or unmanaged may comprise not having an assigned naming convention and/or not being mapped to already registered or pre-existing IT assets of the enterprise 100. In several aspects the discovering of the IT resource at step 205 is based on meta data, which may include or be registration or application meta data related to the IT resource that is stored in, and provided by, a CMDB, such as CMDB 105, FIG. 1, to the access control system, in response to an API call or other form of digitized or computer-based communication request from the access control system. The API call may be initiated by the TAC, or it may occur periodically, or automatically. The discovery at step 205 may also be triggered by events such as receiving a notification from one or more parts of the enterprise 100, triggered by a periodic scan, by detection or knowledge of the TAC of changes including installations, modifications to, or deletion of one or more IT resources on the enterprise 100. The IT resource may in various embodiments be an application, program, or other software or software package. The IT resource may also be a technological or hardware asset that is added to the enterprise 100, such as a computing device, a cellular or mobile device, a database, a server, or computing equipment or peripherals. Therefore, depending on the embodiment, the IT resource may comprise a newly registered IT application, or a resource newly linked with an existing IT application, where the new IT resource may comprise hardware.

Upon discovering an unregistered or new IT resource at step 205, the TAC may undertake generating, at step 210, an entitlement for one or more groups of enterprise users, for example users 125, FIG. 1, that may be users or groups of users of the IT resource, or they may be users or groups that are part of the enterprise but not projected to be users of the IT resource. As part of the centralized system that the TAC provides the enterprise, all IT resources and assets are managed or registered based on created entitlements that are based on a uniform naming convention (also referred to herein as an "LDAP group naming convention" or "naming convention"). In several aspects, the entitlement is created in an LDAP server, such as LDAP server 115, FIG. 1, of the enterprise 100. In various aspects the entitlement is embodied or created within an LDAP group name. In several embodiments, the entitlement is determined based on meta data associated with the IT resource in combination with the uniform naming convention utilized by the TAC. The predefined naming convention may include meta data associated with the IT resource that is stored in the CMDB.

An example of an LDAP group naming convention for a windows environment is set out in Table-1 below:

TABLE 1

| LDAP group naming convention | | | | |
| --- | --- | --- | --- | --- |
| Sequence | Definition | Max Length | Description | Examples |
| 1 | TYPE | 3 | TAC role type, pa or tac | pa, tac |
| 2 | EONID | 6 | EONID of the application | 123456 |
| 3 | ENV | 4 | Environment of the application | dev, qa, uat, prod |
| 4 | INFRA | 5 | Infrastructure type | win, unx |
| 5 | ROLE | 5 | Role name | read, write, admin, rdp |

The LDAP group naming convention may contain a number of sequences that may make up the full name defining the entitlement, with each sequence having a maximum length of an associated string, of other characters, or bytes. The naming convention may also have several definitions that may define the type of entitlement or name, the ID of an application, or other IT resource or asset, the environment the application or asset will be deployed, the infrastructure type, for example, windows, linux, unix and the like, and the roles associated with the specific name, for example a read-only role, and read and write role, an admin role, or an "rdp" (remote desktop) role for example, with the roles defining the permissions associated or available to members of a group defined by the particular name defining the entitlement. Various other definitions or parameters may be added to customize each name or naming convention.

An example name created by the naming convention may be comprised of the following parameters each with its own value as follows: for Application ID='00001', Environment='QA' (quality assurance), Asset Type='Windows', Role='rdp', the LDAP group name could be like: TAC_00001_QA_WIN_RDP. The LDAP server storing this name would act as the technology entitlement store. The naming convention is critical, as it ensures the uniqueness of entitlement structure and content for a specific IT Asset. As another example, a new resource with Application ID='00002', Environment='Prod' (production), Asset Type='Linux', Role='read', might have a LDAP group name of: TAC_00002_Prod_Linux Read.

Finally, method 200 may comprise, at step 215, mapping, by the TAC, the entitlement for each of the one or more groups to one or more target IT assets (also referred to as "pre-existing IT asset(s)" or "pre-existing IT resource(s)") of the enterprise already registered, based on the LDAP group name. These target IT assets may be servers, databases, applications, operating systems or management or deployment software utilized to control and manage access or provide a user interface to access IT resources on the enterprise. In various aspects, the mapping may include executing a script or program configured to associate the LDAP group or LDAP group name to the one or more target or pre-existing IT assets, to allow use of the new IT resource with the one or more target or pre-existing IT assets.

One exemplary embodiment of method 200 is an example installation of graphic design software onto an IT infrastructure system, whereas it may be installed on the system with at least its meta data if not the whole application being stored on the CMDB. The TAC will discover, at step 205, the installed unregistered application, and may do so based on a scan of the CMDB that may occur at predetermined times or periodically; or the TAC may receive information from anywhere in the enterprise to allow it to detect or determine that a new application has been installed on the CMDB. Alternatively, TAC may first detect the installed application and may then optionally additionally determine that the application is unregistered with the rest of the system or unmanaged by the system or the TAC. The TAC may then generate, at step 210, an entitlement for one or more groups of users of the enterprise, for the unmanaged application or new IT resource. The entitlement preferably is created based on the naming convention as well as the meta data of the application as registered in the CMDB, where the meta data may define various aspects and details of the application such as the software platform(s) it will be run on or is compatible with, the types of hardware it is designed for, the users that it is targeted for, the properties of the application such as file names, sizes and types, as well as environments it will be deployed in, any licenses that may be associated with the application, and the like.

The entitlement may be based solely on the name generated from the naming convention. Once the entitlement is generated, and several entitlements may be created for a number of users or groups of users, the entitlement is mapped at step 215 by the TAC into existing IT assets. If the enterprise is running both windows and linux systems, the application may only be operable on assets running the windows systems, and not operable on those servers or devices not running a windows system. Therefore, the TAC may map the application only on assets running Windows. Additionally, based on the meta data that the entitlements were created with, only one group of users, or team, in the enterprise may have licenses for this software, such as a graphics design team. Thus group/team may be defined in one of the naming convention parameters as 'GD'. If for example the design team only uses Windows hardware or servers, then the entitlement may be mapped to those Windows servers that run software for the 'GD' team but no other Windows hardware, databases or servers. Therefore, the entitlement may have parameters that define the users as well as parameters that may further define device and user mappings to the new IT resource or application, parameters defining for example any relevant servers, devices, or other IT resources or assets that should be associated with these newly created entitlements.

Figure 3:
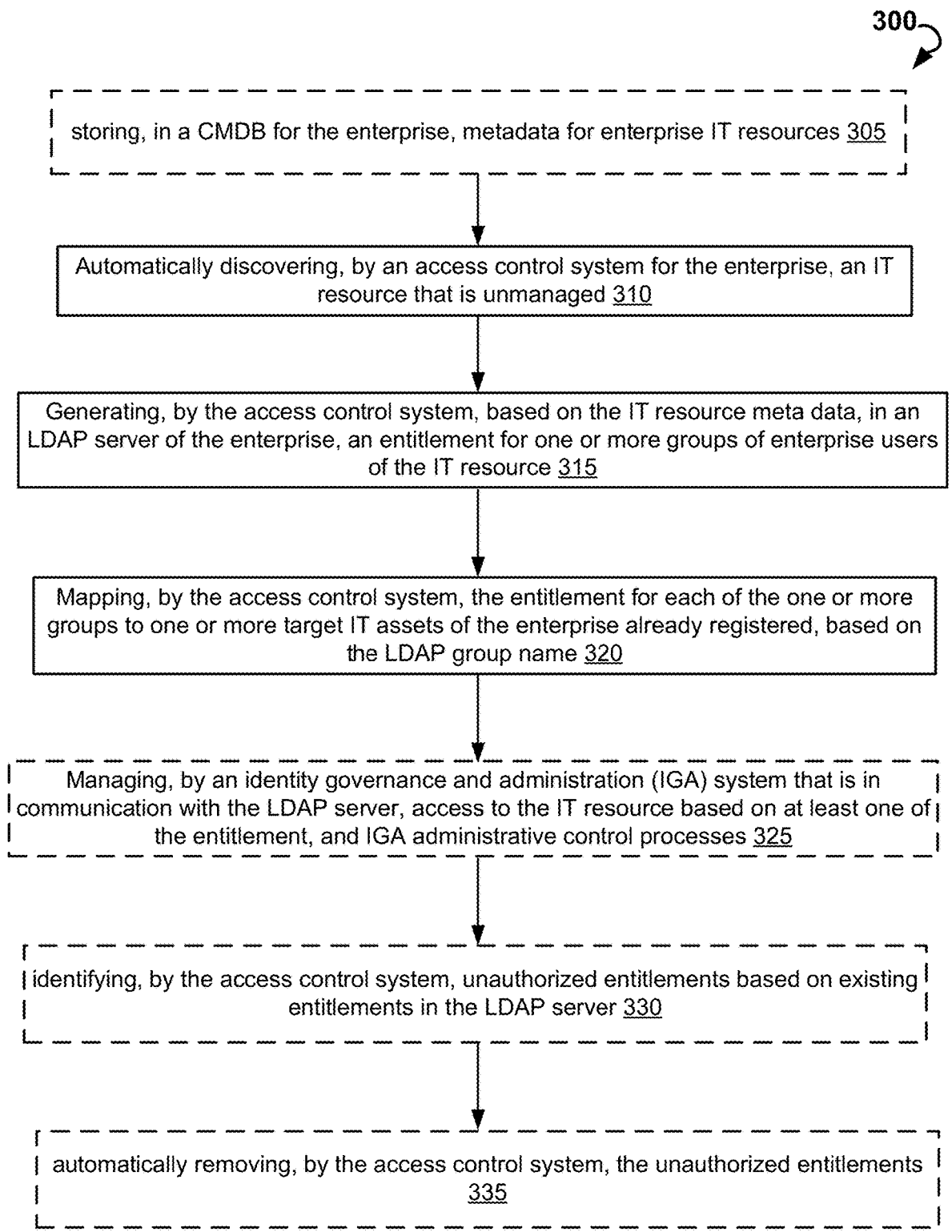
FIG. 3 is a flow chart of another embodiment of a process to provide automated entitlement creation and control for IT applications in an IT Infrastructure System.

FIG. 3 is a flow chart of another embodiment of a process 300 to provide automated entitlement creation and control for IT applications in an IT Infrastructure System. Process 300 may include storing, at step 305, in a CMDB, for example CMDB 105, FIG. 1, of the enterprise, meta data for enterprise IT resources. The meta data may comprises, for each IT resource of the IT resources, data of pre-existing or registered IT assets, for example assets 130, FIG. 1, of the enterprise associated with the each IT resource or asset, wherein the meta data may comprise the new IT resource meta data. The stored meta data may comprise registration and/or application meta data, as well as meta data of any enterprise IT asset and/or managed by the TAC tool. The TAC may be configured to automatically discover, at step 310, an IT resource that is unmanaged. The unmanaged IT resource or asset may be a new IT resource. In several aspects, multiple IT resources may be automatically discovered at step 310 simultaneously. In various embodiments the discovering is a discovery that an IT resource is unmanaged. Being unregistered on unmanaged may comprise not having an assigned naming convention and/or not being mapped to already registered IT assets of the enterprise. In several aspects the discovering at step 310 of the IT resource is based on meta data, which may be provided by the CMDB, and may be provided, in several aspects, to the TAC in response to an API call or other form of digitized or computer-based communication request from the access control system. The API call may be initiated by the TAC, or it may occur periodically, or automatically.

The discovering at step 310 may also be triggered by events such as receiving a notification from one or more parts of the system, triggered by a periodic scan, or detection or knowledge by the TAC of modifications or changed to the enterprise, including the installation, movement, deletion or changes to files of other IT resources on the enterprise. The IT resource may in various embodiments be an application, program, or other software or software package. The IT resource may also be a technological or hardware asset that is added to the system, such as a computing device, a cellular or mobile device, a database, a server, or computing equipment or peripherals. Therefore, depending on the embodiment, the IT resource may comprise a newly registered IT application, or a resource newly linked with an existing IT application, wherein the new IT resource may comprise hardware.

Upon discovering an unregistered IT resource at step 310, the TAC may undertake generating, at step 315, an entitlement for users or one or more groups of enterprise users. As part of the centralized TAC system, all IT resources and assets are managed or registered based on created entitlements based on a uniform naming convention. In several aspects, the entitlement is created in an LDAP server of the enterprise, such as LDAP server 115, FIG. 1. In various aspects the entitlement is embodied or created within an LDAP group name. In several embodiments, the entitlement is determined based on meta data associated with the IT resource in combination with the uniform naming convention utilized by the TAC. The pre-defined naming convention may include the meta data associated with the IT resource that may be stored in the CMDB.

Finally, method 300 may comprise mapping, at step 320, by the TAC, the entitlement for each of the one or more groups to one or more target IT assets of the enterprise already registered, based on the LDAP group name. These target IT assets may be servers, databases, applications, operating systems or management or deployment software utilized to control access or provide a user interface to access IT resources on the enterprise. Mapping at step 320 may comprise all the elements and features of mapping step 215, FIG. 2. In various aspects, the mapping may include executing a script or program configured to associate the LDAP group or LDAP group name to the one or more target or pre-existing IT assets, to allow use of the new IT resource with the one or more target or pre-existing IT assets.

Method 300 may also comprise optional step 325 of managing, by an identity governance and administration (IGA) system, for example IGA tool 120, FIG. 1, which is in communication with the LDAP server, access to the IT resource based on at least one of: the entitlement, and IGA administrative control processes. Management of the created entitlements or enforcing the entitlements therefore may be undertaken by the IGA tool. After creating an entitlement and mapping the entitlement to one or more IT resources or assets, and mapping entitlements associating different IT assets together under an entitlement, the IGA tool can determine whether a user or group of users is able to access the IT resource, view, read, write, modify, delete, execute, or take any other action that utilizes the IT resource.

The IGA tool is not solely governed by the entitlement, but also may rely on administrative policies and rules, for example, if a user is part of a group, or utilizing a machine which is designated an entitlement that would ordinarily allow the user to use an application on the designated device, the user may be denied such access if administrative policies determine that the user should not be allowed access. For example a designer in the design team may be allowed based on the entitlement to access the design software, but a secretary in the design team who may be covered by the design team entitlement, may not based on his or her job description in the system and the IGA tool be allowed access to the design software, i.e., the internal administrative policies applied by the IGA tool may override the entitlement or work together with entitlements to determine permissions that deny access to the IT resource for the secretary even if under the entitlement, the secretary is part of the group with access to the design software. Of course in various aspects, the entitlement may be the only factor the IGA tool uses to determine, or enforce access or management of IT resources, without any input from other administrative rules or policies.

In several aspects, the TAC, may automatically identify, at step 330, unauthorized entitlements based on existing entitlements in the LDAP server. This identifying step 330 is generally undertaken by the TAC where the TAC detects or identifies at step 330 entitlements that do not fit or conform to pre-defined rules. This could be failure to conform to the LDAP group naming convention, the structure of the naming convention, or including the wrong meta data, the wrong number of sequences, the wrong sequences, or other forms of invalid information in the name defining the entitlement. This identification at step 330 of false or invalid entitlements may also protect against the risk that some users who receive administrative entitlements may abuse that entitlement by creating other entitlements that may fall outside of TAC's definitions, conventions, and control, and grant these entitlement to other users or groups. The identification step 330 may be automatically undertaken by TAC, and may occur on a periodic basis based on scans undertaken or directed by the TAC, or be triggered by one or more events in the enterprise.

Finally, method 300 may comprise another optional step 335 of automatically removing the unauthorized entitlements detected and/or identified at step 330 by the TAC tool. This step 335 could include deletion of the unauthorized entitlements or it could include making modifications to these entitlements or taking other remedial or corrective steps to alter the entitlements to conform to pre-defined rules of accepted naming conventions if possible. Because the naming convention as well as the generating of names to create entitlements may be undertaken automatically by the TAC, the TAC may also be capable of scanning or checking each sequence of the LDAP group for discrepancies from acceptable naming conventions and make automatic modifications to the name defining the entitlement(s). Changes may be made to the LDAP group name to resemble other closely related names, or to meet another set of rules or criteria that set out how the remedial steps should function to modify or alter names to become authorized entitlements. Changes may also be made to update or modify existing naming conventions and pre-defined rules automatically by the TAC.

Figure 4:
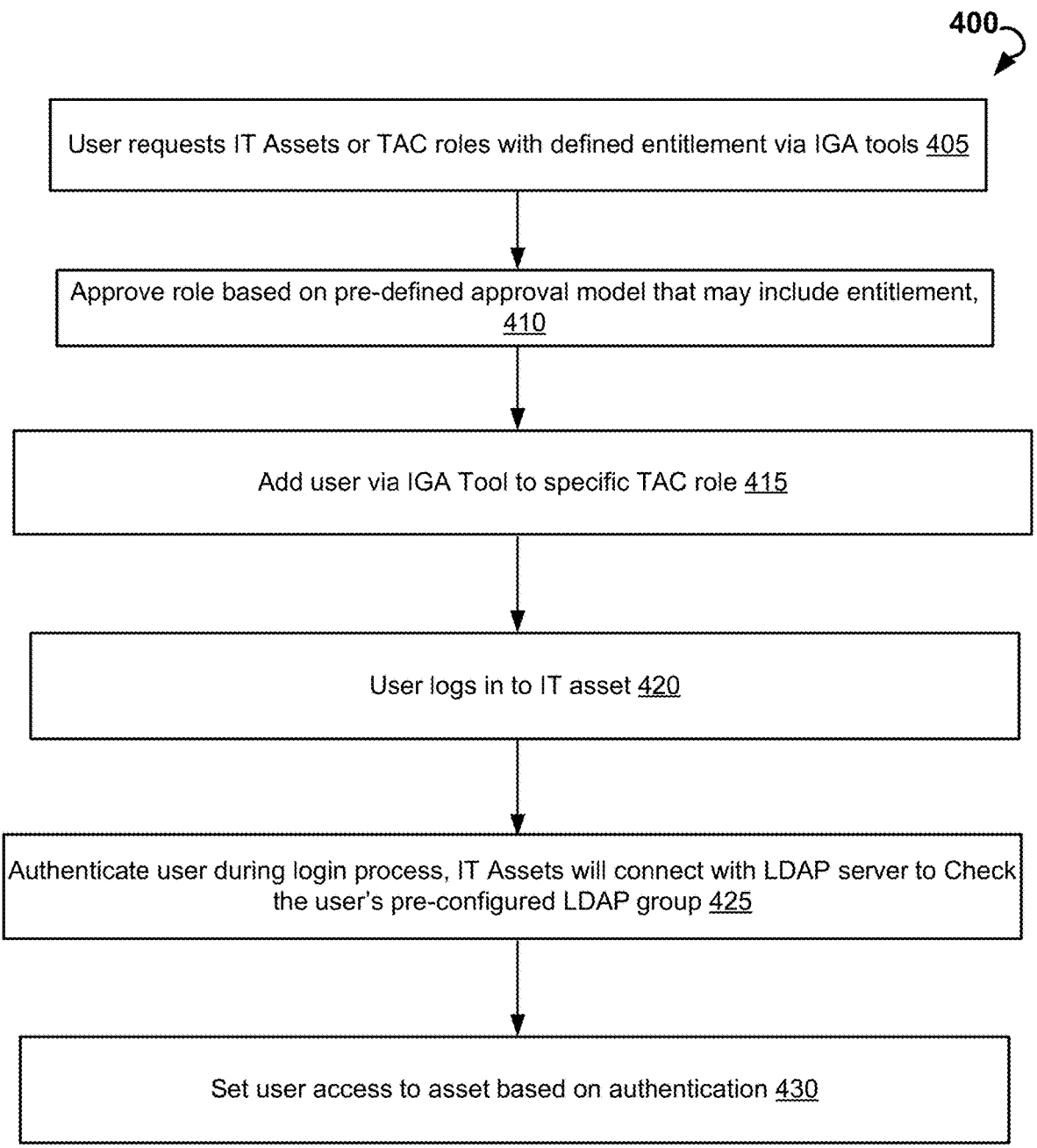
FIG. 4 is a flow chart of a process to manage user access and roles in an IT infrastructure system, based on the rule-based entitlement systems and methods herein.

FIG. 4 is a flow chart of a process to manage user access and roles in an IT Infrastructure System, such as enterprise 100, FIG. 1, based on the rule-based entitlement systems and methods described herein. Entitlements may be managed by tools or systems that are external to the TAC, but within the IT infrastructure enterprise. This includes users, servers, operating systems and the IGA all playing a role in the management and the application of created entitlements, and maintained by TAC. In one aspect, the method 400 to manage user access or roles may commence with a user requesting, at step 405, a specific IT asset, or a specific role in relation to one or more IT assets. For example, a user, such as user 125, FIG. 1, may request that he/she have access to a newly installed and registered design software that is available to the design team the user is part of. The user may be able to do this through an application request platform that determines, based on entitlements, what applications the user can see, request access to, or download, for example. The application request platform and applications available to be viewed, requested, or downloaded may also be based on internal administrative rules and policies. This step could be undertaken with an IGA tool, such as IGA tool 120, FIG. 1, depending on the enterprise.

In several embodiments, the IGA tool or other part of the enterprise may approve, at step 410, the role based on a pre-defined approval model that may include entitlements the user has individually or as part of a group, or based on other administrative rules or policies, or a combination thereof as discussed in step 325, FIG. 3. If the IGA tool or managing part of the enterprise approves the role or access of the user to the IT resource, or asset, for example the application or a device such as a laptop, then the IGA tool may add the user to a specific TAC role. This means that, for example, even if initially a user is not within an entitlement group, the IGA tool may determine that a user should fall within an entitlement defined for specific roles, and assign the user or add, at step 415, the user to the role so that the pre-defined entitlement allows the user access to the application. This could apply for new employees, such as, for example, an employee that is a newly hired accountant for the enterprise who needs access to the accounting software. One or more IT assets associated with accounting software, such as cloud services that store accounting data, excel application, servers that store client invoices, for example, each are connected to at least one entitlement, but all these entitlements may include the "accounting" role within the parameters produced from the LDAP group name.

When the new employee logs in as a user, an administrator may, using an IGA tool, add, at step 415, the user to the accounting role, which automatically will allow the user access to all the servers, hardware, and applications with an entitlement defined for "accountant". Depending on the embodiment, the user may either have complete or partial access to these IT resources and assets, to be able to download, or request access to them. The user may log in, at step 420, to access the IT asset which the user may be able to download, read, view, write, modify, or otherwise use. As part of the login process, the LDAP server, such as LDAP server 115, FIG. 1, may either allow the user access the IT asset or not based on the entitlement, the groups the user belongs to, attributes, or roles assigned to a user. If the LDAP server determines that the user meets the requirements of the pre-configured or pre-defined LDAP group(s), as defined by a naming convention, it may, at step 425 authenticate, or allow the IGA tool to authenticate, the user to use the asset. The user access may be set at step 430 by the IGA tool based on the authentication, for a temporary or permanent period or for as long as they fall within the pre-defined LDAP group(s).

Figure 5:
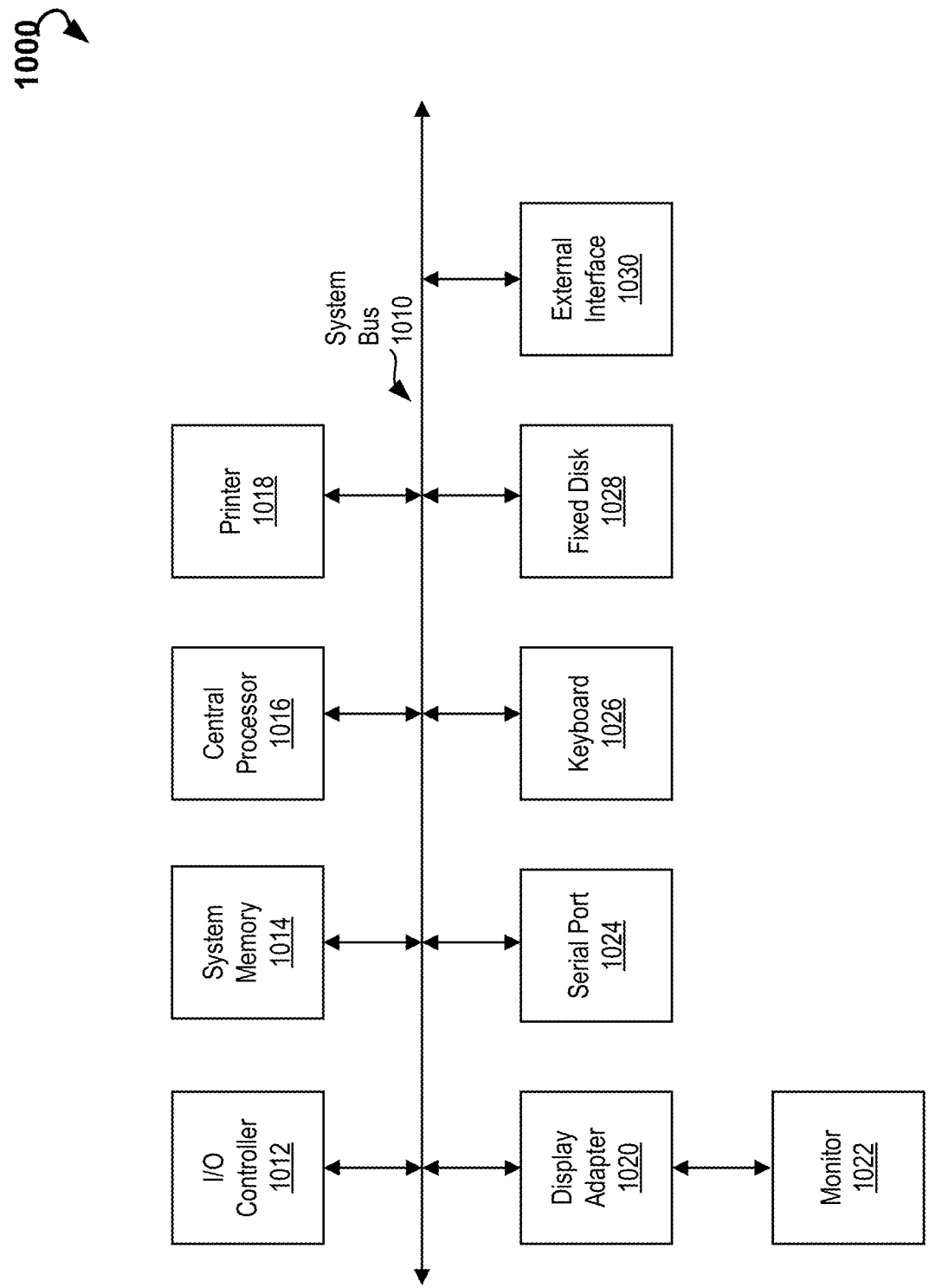
FIG. 5 is a block diagram of a computer apparatus with data processing subsystems or components, capable of undertaking the various methods of the present disclosure.

FIG. 5 is a block diagram of a computer apparatus 1000 with data processing subsystems or components, according to at least one aspect of the present disclosure. The IGA tool 120 and/or the TAC tool 110 may be embodied with a computer apparatus such as illustrated in FIG. 5. The subsystems shown in FIG. 5 are interconnected via a system bus 1010. Additional subsystems such as a printer 1018, keyboard 1026, fixed disk 1028 (or other memory comprising computer readable media), monitor 1022, which is coupled to a display adapter 1020, and others are shown. Peripherals and input/output (I/O) devices, which couple to an I/O controller 1012 (which can be a processor or other suitable controller), can be connected to the computer system by any number of means known in the art, such as a serial port 1024. For example, the serial port 1024 or external interface 1030 can be used to connect the computer apparatus to a wide area network such as the Internet, a mouse input device, or a scanner. The interconnection via system bus allows the central processor 1016 to communicate with each subsystem and to control the execution of instructions from system memory 1014 or the fixed disk 1028, as well as the exchange of information between subsystems. The system memory 1014 and/or the fixed disk 1028 may embody a computer readable medium.

Examples of the method according to various aspects of the present disclosure are provided below in the following numbered clauses. An aspect of the method may include any one or more than one, and any combination of, the numbered clauses described below.

Clause 1. A method for IT applications of an enterprise IT Infrastructure System for an enterprise, the method comprising automatically discovering, by an access control system of the enterprise IT Infrastructure System, an unmanaged, new IT resource for the IT Infrastructure System, based on automatically discovering new IT resource meta data associated with the new IT resource; in response to discovery of the new IT resource, generating, by the access control system, based on the new IT resource meta data, in a lightweight directory access protocol (LDAP) server of the enterprise IT infrastructure system, an entitlement for one or more groups of enterprise users, wherein, for each of the one or more groups, the entitlement is embodied in an LDAP group name, wherein the LDAP group name is determined based on the new IT resource meta data and on a pre-defined LDAP group naming convention; and mapping, by the access control system, the entitlement for each of the one or more groups to one or more target IT assets of the enterprise IT infrastructure system that are already registered with the enterprise IT infrastructure system, wherein the mapping for each of the one or more groups is based on the LDAP group name for each of the one or more groups.

Clause 2. The method of Clause 1, further comprising storing, in a configuration management database (CMDB) for the enterprise IT infrastructure system, meta data for IT resources of the enterprise, wherein the meta data comprises, for each IT resource, data of registered IT assets of the enterprise associated with the each IT resource, wherein the meta data comprise the meta data for the new IT resource meta data.

Clause 3. The method of any of Clauses 1-2, further comprising managing, by an identity governance and administration (IGA) system that is in communication with the LDAP server, access to the new IT resource based on at least one of the entitlement and an IGA administrative control processes of the IGA system.

Clause 4. The method of any of Clauses 1-3, wherein the managing comprises management of access to the new IT resource during a runtime lifecycle of the new IT resource.

Clause 5. The method of any of Clauses 1-4, further comprising identifying, by the access control system, unauthorized entitlements based on existing entitlements in the LDAP server; and automatically removing, by the access control system, the unauthorized entitlements.

Clause 6. The method of any of Clauses 1-5, wherein the mapping comprises executing a script or program configured to associate the LDAP group to the one or more target IT assets, to allow use of the new IT resource with the one or more target IT assets.

Clause 7. The method of any of Clauses 1-6, wherein the LDAP group name comprises the new IT resource meta data, wherein the new IT resource meta data comprises at least one of: an ID, an environment, a type, a role, a role name.

Clause 8. The method of any of Clauses 1-7, wherein the LDAP group naming convention ensures a unique entitlement structure and content.

Clause 9. The method of any of Clauses 1-8, wherein the discovering of the new IT resource is based on meta data provided by a CMDB of the enterprise IT infrastructure system to the access control system, in response to an API call from the access control system to the CMDB.

Clause 10. The method of any of Clauses 1-9, wherein the generating of the entitlement comprises at least one of creating the entitlement, updating the entitlement, and deleting the entitlement by the access control system.

Clause 11. The method of any of Clauses 1-10, wherein the entitlement is based on IT applications associated with the new IT resource, or based on IT infrastructure associated with the new IT resource.

Clause 12. The method of any of Clauses 1-11, wherein the new IT resource may comprise a newly registered IT application, or a resource newly linked with an existing IT application, wherein the new IT resource may comprise hardware.

Clause 13. A computer system for IT applications of an enterprise IT Infrastructure System for an enterprise, the computer system comprising a configuration management database (CMDB) for storing IT resource meta data for IT resources of the enterprise IT Infrastructure System, wherein the IT resource meta data comprises, for each IT resource of the IT resources, data of registered IT assets of the enterprise IT Infrastructure System associated with the each IT resource, wherein the each IT resource may comprise software, hardware or a combination thereof; a lightweight directory access protocol (LDAP) server; and a technology access control tool in communication with the CMDB and the LDAP server, wherein the technology access control tool is configured to automatically discover an IT resource that is unmanaged, based on IT resource meta data for IT resources of the enterprise IT Infrastructure System stored in the CMDB; in response to discovery of the IT resource, generate based on the IT resource meta data, in the LDAP server, an entitlement for each one or more groups of enterprise users, wherein, for each of the one or more groups, the entitlement is embodied in an LDAP group name, wherein the LDAP group name is determined based on the meta data for the IT and on a pre-defined LDAP group naming convention; and map the entitlement for each of the one or more groups to one or more target IT assets of the enterprise IT Infrastructure System already registered, based on the LDAP group name.

Clause 14. The computer system of Clause 13, wherein the technology access tool is configured to generate, by creating the entitlement, updating the entitlement, or deleting the entitlement.

Clause 15. The computer system of any of Clauses 13-14, further comprising an identity governance and administration (IGA) system that is in communication with the LDAP server and configured to manage access to the IT resource based on at least one of the entitlement and an IGA administrative control processes of the IGA system.

Clause 16. The computer system of any of Clauses 13-15, wherein the technology access tool is further configured to identify, unauthorized entitlements based on existing entitlements in the LDAP server; and automatically remove the unauthorized entitlements.

Clause 17. The computer system of any of Clauses 13-16 wherein the technology access tool is configured to map by associating the LDAP group to the one or more target IT assets, to allow use of the IT resource with the one or more target IT assets.

Clause 18. A non-transitory computer-readable storage medium having embodied thereon a program, the program executable by a processor to perform a method for IT applications of an enterprise IT Infrastructure System, the method comprising storing, in a configuration management database (CMDB) for the enterprise IT infrastructure system, IT resource meta data for IT resources of the enterprise, wherein the IT resource meta data comprises, for each IT resource, data of registered IT assets of the enterprise associated with the each IT resource, wherein the meta data comprise the meta data for new IT resource meta data; automatically discovering, by an access control system of the enterprise IT Infrastructure System, an unmanaged, new IT resource for the IT Infrastructure System, based on discovering meta data associated with the new IT resource stored in the CMDB; in response to discovery of the IT resource, generating, by the access control system, based on the IT resource meta data, in a lightweight directory access protocol (LDAP) server of the enterprise IT Infrastructure System, an entitlement for each one or more groups of enterprise users, wherein, for each of the one or more groups, the entitlement is embodied in a lightweight directory access protocol (LDAP) group name, wherein the LDAP group name is determined based on the IT resource meta data and on a pre-defined LDAP group naming convention; mapping, by the access control system, the entitlement for each of the one or more groups to one or more target IT assets of the enterprise IT Infrastructure System already registered with the enterprise IT Infrastructure System, wherein the mapping for each of the one or more groups is based on the LDAP group name for each of the one or more groups; and managing, by an identity governance and administration (IGA) system that is in communication with the LDAP server, access to the IT resource based on at least one of the entitlement, and IGA administrative control processes.

Clause 19. The non-transitory computer-readable storage medium of Clause 18, wherein the IT resource meta data further comprises at least one of: an ID, an environment, a type, a role, a role name.

Clause 20. The non-transitory computer-readable storage medium of Clauses 18-19, wherein the program executable by the processor to perform the method further comprises: identifying, by the access control system, unauthorized entitlements based on existing entitlements in the LDAP server; and automatically removing, by the access control system, the unauthorized entitlements.

The foregoing detailed description includes references to the accompanying drawings, which form a part of the detailed description. The drawings show illustrations in accordance with exemplary aspects. These example aspects, which are also referred to herein as "examples," are described in enough detail to enable those skilled in the art to practice the present subject matter.

The various aspects described above, are presented as examples only, and not as a limitation. The descriptions are not intended to limit the scope of the present technology to the forms set forth herein. To the contrary, the present descriptions are intended to cover such alternatives, modifications, and equivalents as may be included within the scope of the present technology as appreciated by one of ordinary skill in the art.

While specific aspects of, and examples for, the system are described above for illustrative purposes, various equivalent modifications are possible within the scope of the system, as those skilled in the relevant art will recognize. For example, while processes or steps are presented in a given order, alternative aspects may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The aspects can be combined, other aspects can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited in the form disclosed. Many modifications and variations will be apparent to those of ordinary skill in the art without departing from the scope of the claimed subject matter. Exemplary aspects were chosen and described to best explain the principles of the present technology and its practical application, and to enable others of ordinary skill in the art to understand the various aspects of the present disclosure with various modifications as are suited to the particular use contemplated.

What is claimed is:

1. A method for automated entitlement creation and control for IT applications of an enterprise IT Infrastructure System for an enterprise, the method comprising:

storing, in a configuration management database (CMDB) for the enterprise IT infrastructure system, meta data for IT resources of the enterprise, wherein the meta data comprise, for each IT resource, data of registered IT assets of the enterprise associated with each IT resource, wherein the meta data stored in the CMDB comprise new IT resource meta data for an unmanaged, new IT resource for the IT Infrastructure System;

automatically discovering, by an access control system of the enterprise IT Infrastructure System, the unmanaged, new IT resource for the IT Infrastructure System, based on automatically discovering the new IT resource meta data for the unmanaged, new IT resource in the CMDB database, wherein the new IT resource meta data are associated with the unmanaged, new IT resource;

in response to discovery of the unmanaged, new IT resource, generating, by the access control system, based on the new IT resource meta data, in a lightweight directory access protocol (LDAP) server of the enterprise IT infrastructure system, an entitlement for one or more groups of enterprise users, wherein, for each of the one or more groups, a value for each of one or more parameters of the entitlement is included in an LDAP group name, wherein the value for each of the one or more parameters is based on the new IT resource meta data and the value for each of the one or more parameters is arranged in the LDAP group name based on a pre-defined LDAP group naming convention; and mapping, by the access control system, the entitlement for each of the one or more groups to one or more target IT assets of the enterprise IT infrastructure system that are already registered with the enterprise IT infrastructure system, wherein the mapping for each of the one or more groups is based on the LDAP group name for each of the one or more groups.

2. The method of claim 1, further comprising:

managing, by an identity governance and administration (IGA) system that is in communication with the LDAP server, access to the unmanaged, new IT resource based on at least one of the entitlement and an IGA administrative control processes of the IGA system.

3. The method of claim 2, wherein the managing comprises management of access to the unmanaged, new IT resource during a runtime lifecycle of the new IT resource.

4. The method of claim 1, further comprising:

identifying, by the access control system, unauthorized entitlements based on existing entitlements in the LDAP server; and automatically removing, by the access control system, the unauthorized entitlements.

5. The method of claim 1, wherein the mapping comprises executing a script or program configured to associate the LDAP group to the one or more target IT assets, to allow use of the unmanaged, new IT resource with the one or more target IT assets.

6. The method of claim 1, wherein the one or more parameters for the new IT resource meta data comprises at least one of: an ID, an environment, a type, a role, a role name.

7. The method of claim 1, wherein the LDAP group naming convention ensures a unique entitlement structure and content.

8. The method of claim 1, wherein the discovering of the unmanaged, new IT resource is based on meta data provided by the CMDB of the enterprise IT infrastructure system to the access control system, in response to an API call from the access control system to the CMDB.

9. The method of claim 1, wherein the generating of the entitlement comprises at least one of creating the entitlement, updating the entitlement, and deleting the entitlement by the access control system.

10. The method of claim 1 wherein the entitlement is based on IT applications associated with the unmanaged, new IT resource, or based on IT infrastructure associated with the unmanaged, new IT resource.

11. The method of claim 1 wherein the unmanaged, new IT resource comprises a newly registered IT application, or a resource newly linked with an existing IT application, wherein the unmanaged, new IT resource comprises hardware.

12. A computer system for automated entitlement creation and control for IT applications of an enterprise IT Infrastructure System for an enterprise, the computer system comprising:
a configuration management database (CMDB) for storing IT resource meta data for IT resources of the enterprise IT Infrastructure System, wherein the IT resource meta data comprises, for each IT resource of the IT resources, data of registered IT assets of the enterprise IT Infrastructure System associated with each IT resource, wherein the meta data stored in the CMDB comprise new IT resource meta data for an unmanaged IT resource of the IT Infrastructure System, and wherein each IT resource may comprise software, hardware or a combination thereof;
a lightweight directory access protocol (LDAP) server; and
a technology access control tool in communication with the CMDB and the LDAP server, wherein the technology access control tool is configured to:
automatically discover the unmanaged IT resource based on the new IT resource meta data stored in the CMDB for the unmanaged IT resource;
in response to discovery of the unmanaged IT resource, generate based on the new IT resource meta data for the unmanaged IT resource, in the LDAP server, an entitlement for each one or more groups of enterprise users, wherein, for each of the one or more groups, a value for each of one or more parameters of the entitlement is included in an LDAP group name, wherein the value for each of the one or more parameters is based on the new IT resource meta data for the IT and the value for each of the one or more parameters is arranged in the LDAP group name based on a pre-defined LDAP group naming convention; and
map the entitlement for each of the one or more groups to one or more target IT assets of the enterprise IT Infrastructure System already registered, based on the LDAP group name.

13. The computer system of claim 12 wherein the technology access tool is configured to generate, by creating the entitlement, updating the entitlement, or deleting the entitlement.

14. The computer system of claim 12, further comprising:
an identity governance and administration (IGA) system that is in communication with the LDAP server and configured to manage access to the unmanaged IT resource based on at least one of the entitlement and an IGA administrative control processes of the IGA system.

15. The computer system of claim 12, wherein the technology access tool is further configured to:
identify, unauthorized entitlements based on existing entitlements in the LDAP server; and
automatically remove the unauthorized entitlements.

16. The computer system of claim 12 wherein the technology access tool is configured to map by associating the LDAP group to the one or more target IT assets, to allow use of the unmanaged IT resource with the one or more target IT assets.

17. A non-transitory computer-readable storage medium having embodied thereon a program, the program executable by a processor to perform a method for automated entitlement creation and control for IT applications of an enterprise IT Infrastructure System, the method comprising:
storing, in a configuration management database (CMDB) for the enterprise IT infrastructure system, IT resource meta data for IT resources of the enterprise, wherein the IT resource meta data comprises, for each IT resource, data of registered IT assets of the enterprise associated with the each IT resource, wherein the meta data stored in the CMDB comprise new IT resource meta data for a new IT resource;
automatically discovering, by an access control system of the enterprise IT Infrastructure System, the new IT resource for the IT Infrastructure System, based on discovering the new IT resource meta data associated with the new IT resource stored in the CMDB;
in response to discovery of the new IT resource, generating, by the access control system, based on the new IT resource meta data, in a lightweight directory access protocol (LDAP) server of the enterprise IT Infrastructure System, an entitlement for each one or more groups of enterprise users, wherein, for each of the one or more groups, a value for each of one or more parameters of the entitlement is included in a lightweight directory access protocol (LDAP) group name, wherein the value for each of the one or more parameters is based on the new IT resource meta data and the value for each of the one or more parameters is arranged in the LDAP group name based on a pre-defined LDAP group naming convention;
mapping, by the access control system, the entitlement for each of the one or more groups to one or more target IT assets of the enterprise IT Infrastructure System already registered with the enterprise IT Infrastructure System, wherein the mapping for each of the one or more groups is based on the LDAP group name for each of the one or more groups; and
managing, by an identity governance and administration (IGA) system that is in communication with the LDAP server, access to the new IT resource based on at least one of the entitlement, and IGA administrative control processes.

18. The non-transitory computer-readable storage medium of claim 17, wherein the one or more parameters for the new IT resource meta data further comprises at least one of: an ID, an environment, a type, a role, a role name.

19. The non-transitory computer-readable storage medium of claim 17, wherein the program executable by the processor to perform the method further comprises:
   identifying, by the access control system, unauthorized entitlements based on existing entitlements in the LDAP server; and
   automatically removing, by the access control system, the unauthorized entitlements.

* * * * *